(12) United States Patent
Narita

(10) Patent No.: US 11,843,743 B2
(45) Date of Patent: Dec. 12, 2023

(54) INFORMATION PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Tateki Narita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/844,519

(22) Filed: Jun. 20, 2022

(65) Prior Publication Data
US 2022/0407974 A1 Dec. 22, 2022

(30) Foreign Application Priority Data
Jun. 21, 2021 (JP) .................. 2021-102402

(51) Int. Cl.
*H04N 1/12* (2006.01)
*H04N 1/00* (2006.01)
*H04N 1/32* (2006.01)

(52) U.S. Cl.
CPC ..... *H04N 1/00803* (2013.01); *H04N 1/00811* (2013.01); *H04N 1/32106* (2013.01); *H04N 2201/3204* (2013.01)

(58) Field of Classification Search
CPC ........... H04N 1/00803; H04N 1/00811; H04N 1/32106; H04N 2201/3204
See application file for complete search history.

(56) References Cited

U.S. PATENT DOCUMENTS

2009/0237718 A1* 9/2009 Hiro ................... H04N 1/00687
358/1.15
2014/0253972 A1* 9/2014 Minato ................ H04N 1/2175
358/1.15

FOREIGN PATENT DOCUMENTS

JP 2004-029530 A 1/2004

* cited by examiner

*Primary Examiner* — Moustapha Diaby
(74) *Attorney, Agent, or Firm* — Canon U.S.A., Inc. IP Division

(57) ABSTRACT

An information processing apparatus includes a feeding unit that feeds a document placed on a document placement unit, a reception unit that receives an execution instruction, a first reading unit that reads an image of the fed document to generate first image data, a second reading unit that reads an image of a document placed on a platen to generate second image data, an execution unit that, based on the reception unit receiving a single execution instruction, executes first processing in which the first reading unit reads the image of the fed document to generate the first image data, and second processing in which the second reading unit reads the image of the document placed on the platen to generate the second image data, and a storage unit that executes processing for storing the first image data and the second image data.

9 Claims, 14 Drawing Sheets

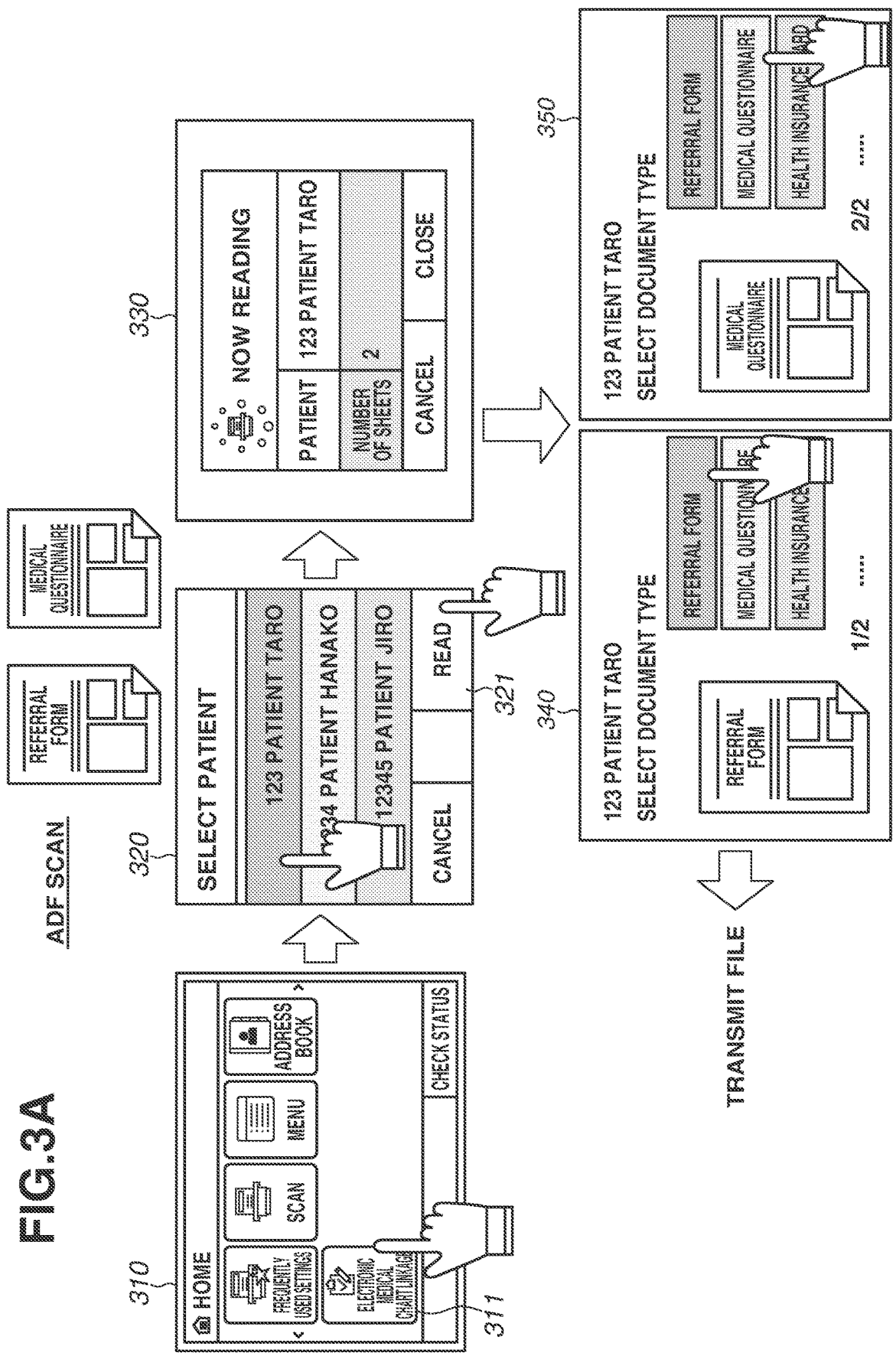

FIG. 4

410 REGISTER DOCUMENT SET INFORMATION
- FIRST VISIT SET
- HOSPITAL ADMISSION SET
- MEDICAL EXAMINATION SET
- CUSTOM 1 (NOT REGISTERED)
- CUSTOM 2 (NOT REGISTERED)
- ....

420 FIRST VISIT SET: DOCUMENT TYPE
1. REFERRAL FORM *ADF SCAN ONE-SIDED 1 SHEET*
2. MEDICAL QUESTIONNAIRE
3. HEALTH INSURANCE CARD *FB SCAN ONE-SIDED 1 SHEET*
- (ADD)
- ....
- ....

430 FIRST VISIT SET: SETTINGS
- READING METHOD: ADF SCAN
- DOUBLE-SIDED SETTING: ONE-SIDED
- NUMBER OF SHEETS: 1
- COLOR MODE: COLOR
- RESOLUTION: 300 × 300
- FILE FORMAT: PDF (OCR)

440 FIRST VISIT SET: SETTINGS
- READING METHOD: ADF SCAN
- DOUBLE-SIDED SETTING: ONE-SIDED
- NUMBER OF SHEETS: 2
- COLOR MODE: COLOR
- RESOLUTION: 300 × 300
- FILE FORMAT: PDF (OCR)

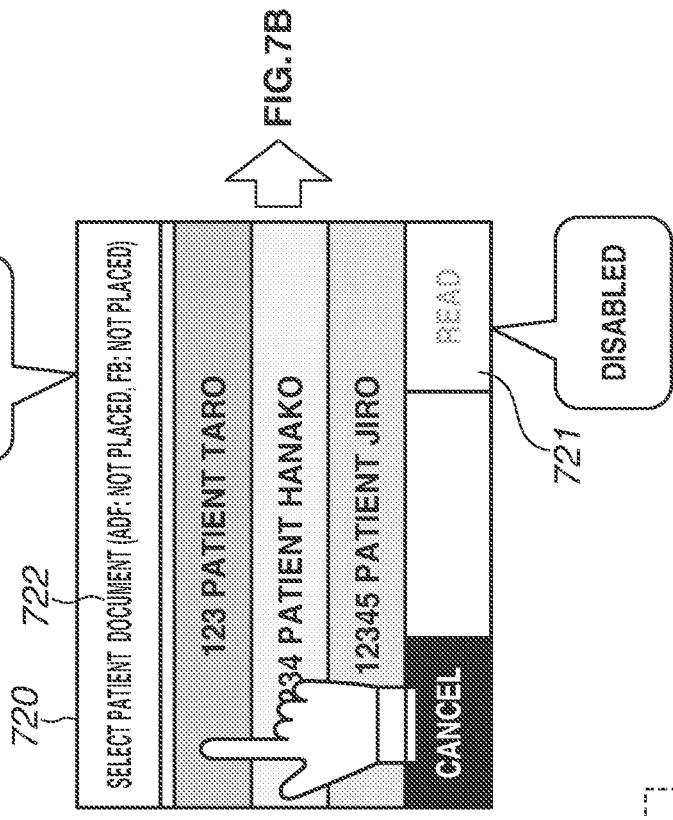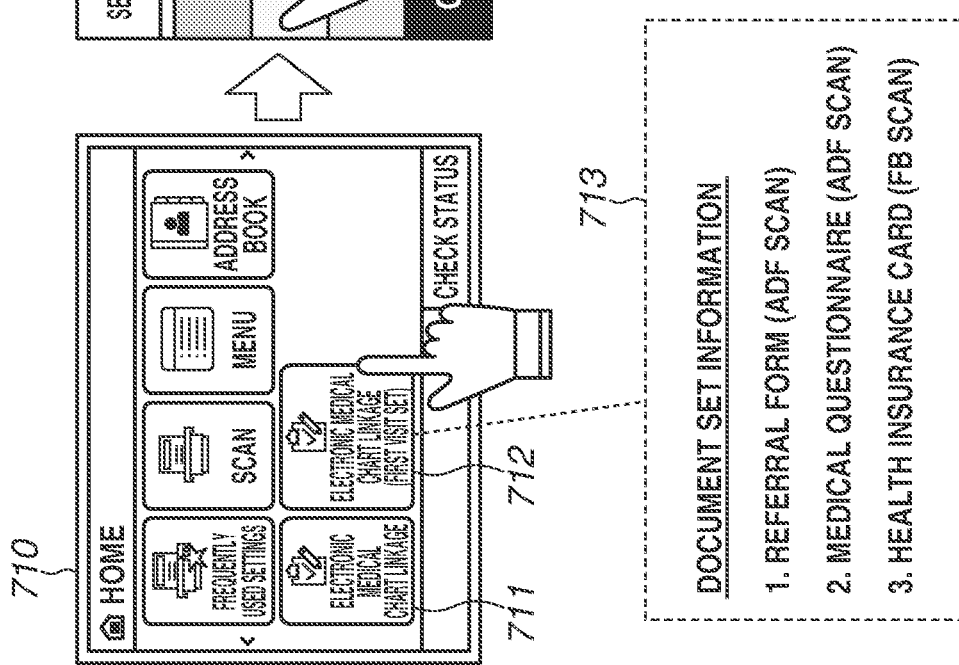
FIG.7A

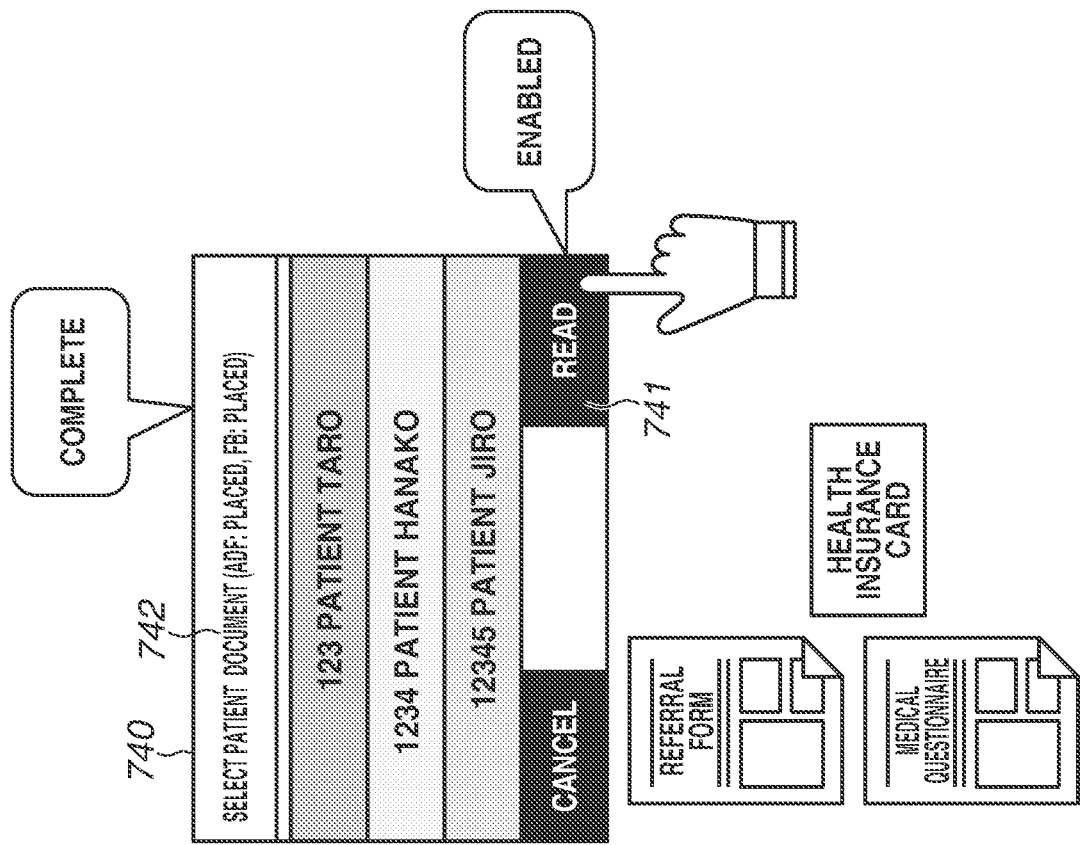
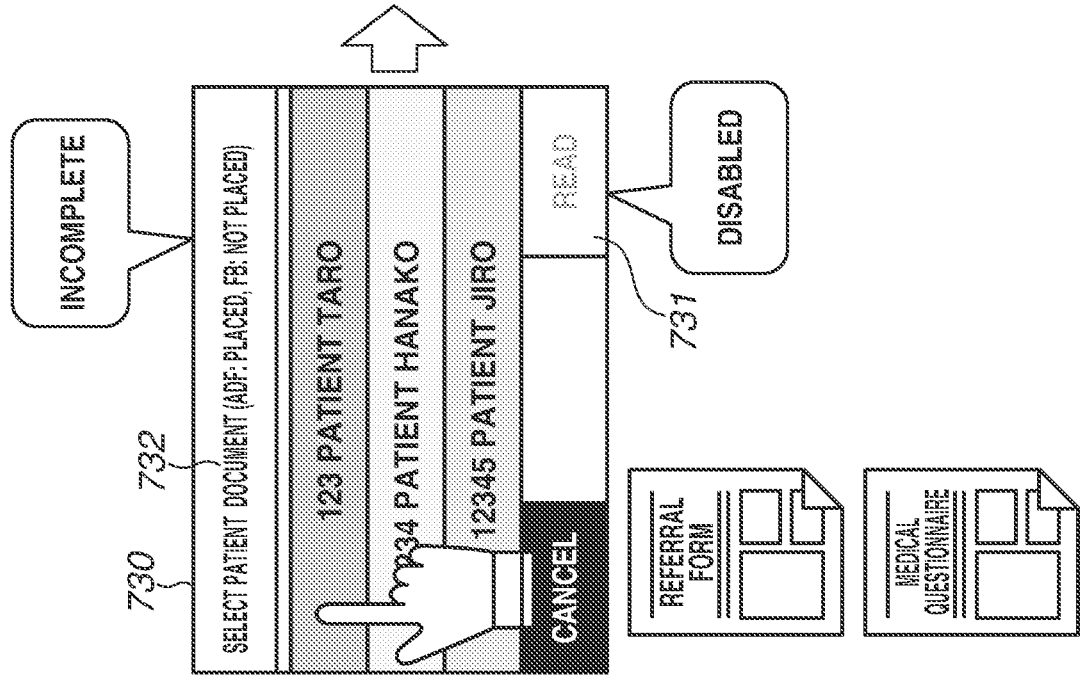

■ FILE NAME 810
[PATIENT ID]_[DOCUMENT TYPE]_[DATE AND TIME]_[SET NUMBER].pdf

PATIENT ID: 12345
DOCUMENT TYPE: REFERRAL FORM
DATE AND TIME: 20200728152130
SET NUMBER: 1111

811 [12345]_[REFERRAL FORM]_[20200728152130]_[1111].pdf

812 [12345]_[MEDICAL QUESTIONNAIRE]_[20200728152135]_[1111].pdf

813 [12345]_[HEALTH INSURANCE CARD]_[20200728152140]_[1111].pdf

■ EXAMPLE OF DISPLAY ON ELECTRONIC MEDICAL CHART SYSTEM BASED ON SET INFORMATION

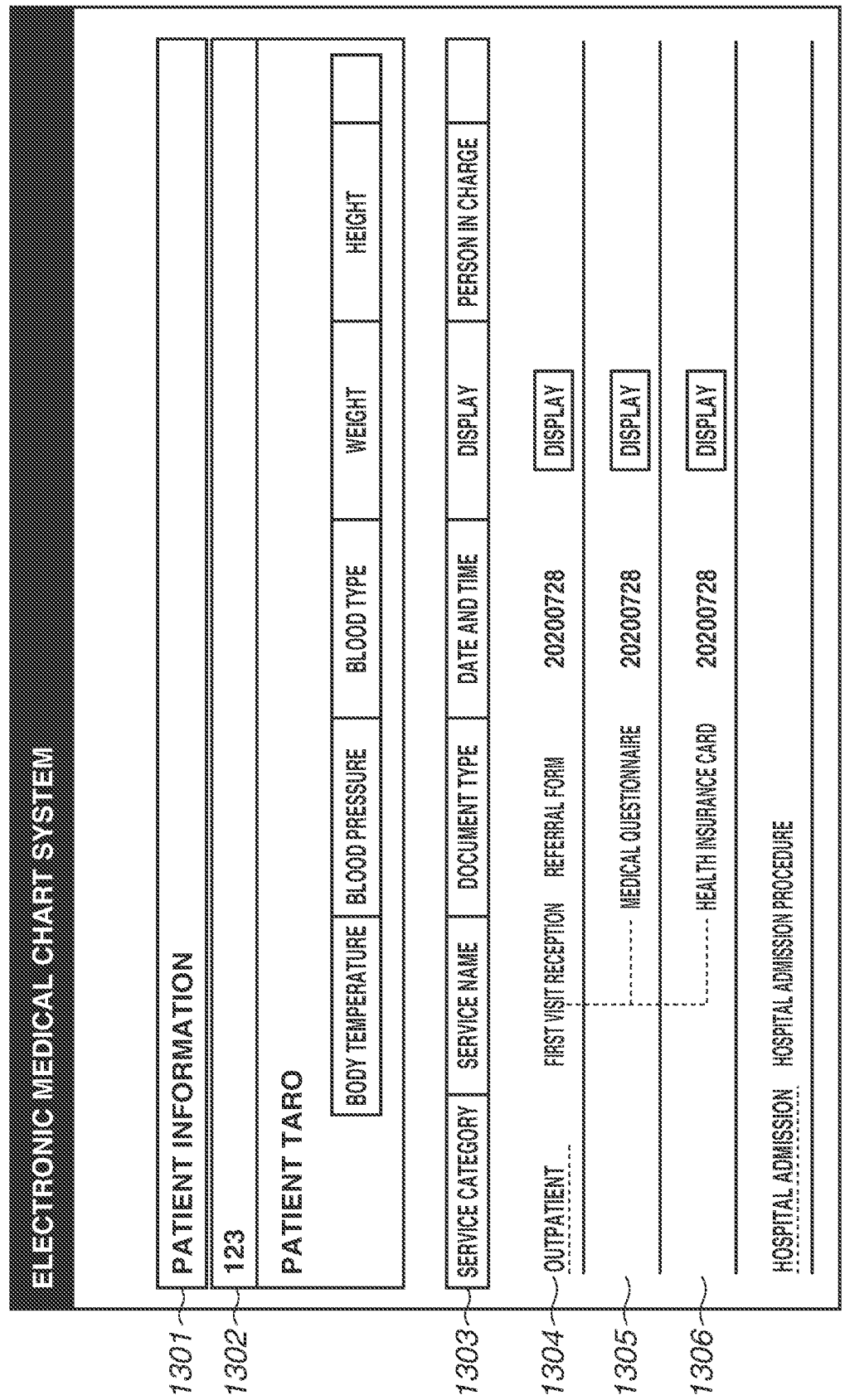

INFORMATION PROCESSING APPARATUS, METHOD FOR CONTROLLING THE SAME, AND STORAGE MEDIUM

BACKGROUND

Field

The present disclosure relates to an information processing apparatus, a method for controlling the information processing apparatus, and a storage medium.

Description of the Related Art

Japanese Patent Application Laid-open No. 2004-29530 discusses an image reading apparatus that feeds and scans a document if the document is placed on an automatic document feeder (ADF) when receiving a scan instruction, and scans a document using a flatbed (FB) method if no document is placed on the ADF when receiving a scan instruction.

In a case where images of a document including a plurality of sheets are to be read, using an ADF method to feed the plurality of sheets and read the images of the document can save the user time and effort. In a case where an image of a document (e.g., a health insurance card) that cannot be fed and read using the ADF method is to be read, the FB method is used to read the image of the document placed on a platen.

In a case where a document including a plurality of sheets and a document such as a health insurance card are to be scanned by the image reading apparatus discussed in Japanese Patent Application Laid-open No. 2004-29530, the user needs to input an execution instruction for scanning the document including the plurality of sheets using the ADF method and to input another execution instruction for scanning the document such as the health insurance card using the FB method.

After placing a document to be scanned using one of the ADF method and the FB method and waiting for completion of scanning the document, a user needs to place another document to be scanned using the other method and to input the execution instruction.

SUMMARY

The present disclosure is directed to an information processing apparatus that saves user's time and effort in a case where a document is scanned using an automatic document feeder (ADF) method and another document is scanned using a flatbed (FB) method.

According to an aspect of the present disclosure, an information processing apparatus includes a feeding unit configured to feed a document placed on a document placement unit, a reception unit configured to receive an execution instruction, a first reading unit configured to read an image of the document fed from the document placement unit by the feeding unit to generate first image data, a second reading unit configured to read an image of a document placed on a platen to generate second image data, an execution unit configured to, based on the reception unit receiving a single execution instruction, execute first processing in which the first reading unit reads the image of the document fed from the document placement unit to generate the first image data, and second processing in which the second reading unit reads the image of the document placed on the platen to generate the second image data, and a storage unit configured to execute processing for storing the first image data generated by executing the first processing and the second image data generated by executing the second processing.

Further features will become apparent from the following description of exemplary embodiments with reference to the attached drawings.

BRIEF DESCRIPTION OF THE DRAWINGS

FIGS. 3A and 3B are diagrams illustrating an example of a screen flow for registration of image data to the electronic medical chart system.

FIG. 4 is a diagram illustrating an example of a screen flow for performing processing for registering document set information.

FIGS. 7A and 7B are diagrams illustrating another example of the screen flow for reading the images of the documents and transmitting the resultant image data by using the electronic medical chart linkage function.

FIG. 11 is a diagram illustrating an example of the patient information screen of the electronic medical chart system that is displayed in a case where the document set information is added.

DESCRIPTION OF THE EMBODIMENTS

Exemplary embodiments will be described below with reference to the attached drawings. Configurations described in the following exemplary embodiments are merely examples and are not seen to be limiting.

A program for a control unit 115 to implement a flowchart related to an image processing apparatus 100 is stored in a read-only memory (ROM) 102 of the control unit 115, and is loaded into a random access memory (RAM) 104 and executed by a central processing unit (CPU) 103 of the control unit 115.

The present disclosure will describe a case where a referral form, a medical questionnaire, and a health insurance card are scanned as an example of importing scanned documents into an electronic medical chart system 203. The scanned documents will be referred to as the first visit set, and an operation of scanning the documents as one set will be referred to as a document set reading.

Figure 1:
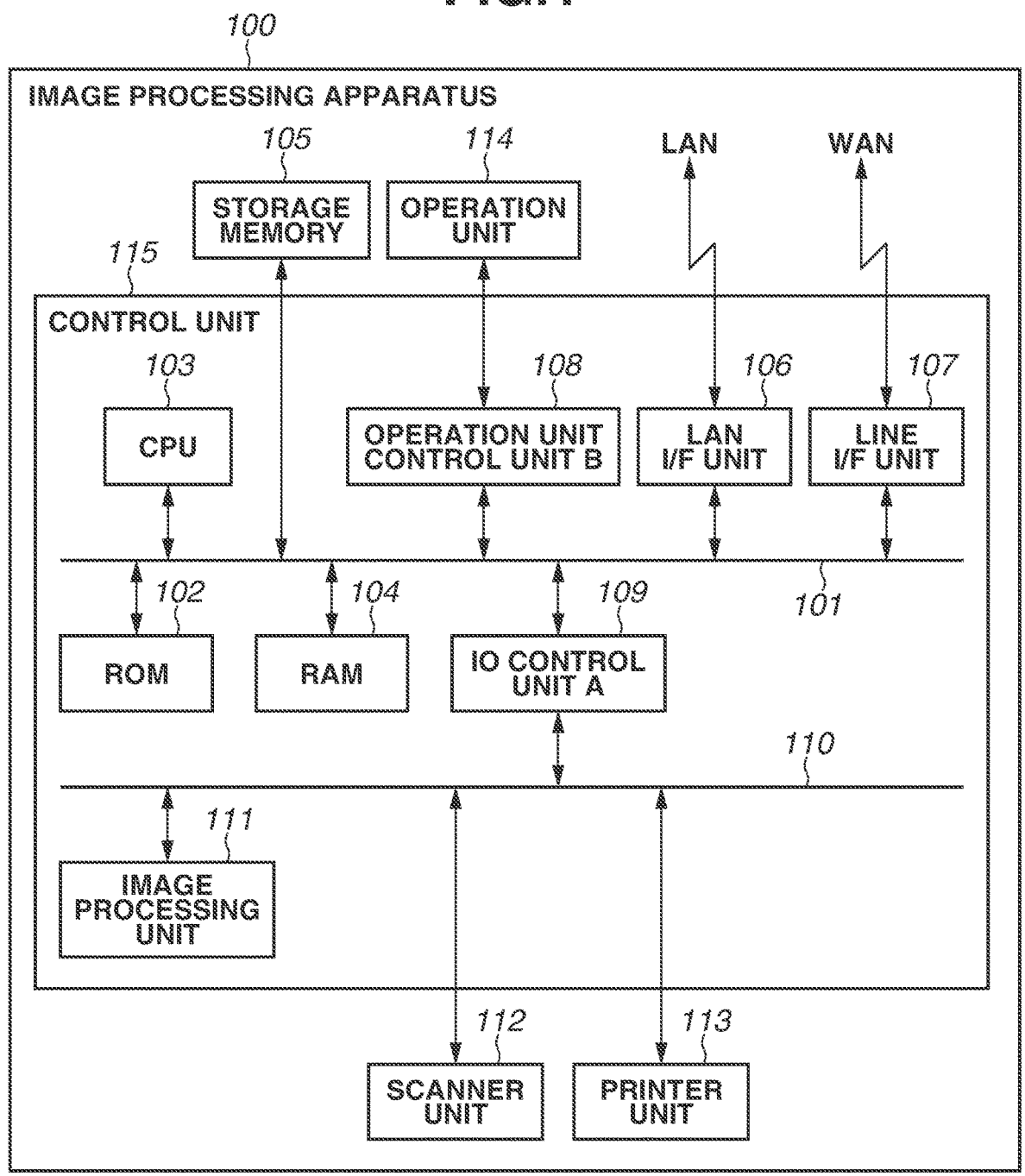
FIG. 1 is a block diagram illustrating an example of a hardware configuration of an image processing apparatus.

FIG. 1 is a block diagram illustrating an example of a hardware configuration of the image processing apparatus 100 according to a first exemplary embodiment. Unless otherwise specified, the present exemplary embodiment is applicable to a single apparatus or a system including a plurality of apparatuses as long as the functions according to the present exemplary embodiment can be performed.

Components in the control unit 115 of the image processing apparatus 100 (information processing apparatus) are connected to a system bus 101 and an image bus 110. More specifically, in the present exemplary embodiment, the image processing apparatus 100 is a multifunction peripheral (MFP). The ROM 102 stores a system boot program. System software for executing functions according to the present exemplary embodiment is stored in the ROM 102 or a storage memory 105 and executed by the CPU 103. The RAM 104 is a system work memory area for the CPU 103 executing the software, and also is an image memory for temporarily storing image data when the image data is processed. The storage memory 105 is used as an internal storage. The storage memory 105 stores data obtained by a scanner unit 112 performing a reading operation, image data, and system software. The storage memory 105 is a hard disk drive (HDD) or a solid state drive (SSD). A local area network (LAN) interface (I/F) unit 106 is an interface (I/F) unit for connecting to a LAN and exchanges information with each apparatus connected to the LAN. A line I/F unit 107 is an I/F unit for connecting to a wide area network (WAN) and exchanges information with each apparatus connected to the WAN. The devices described above are arranged on the system bus 101.

An input and output (IO) control unit A 109 is a bus bridge for connecting the system bus 101 and the image bus 110 that transfers image data at high speed and for converting a data structure of data on the system bus 101. The image bus 110 is a general-purpose bus such as a Peripheral Component Interconnect (PCI) bus, Institute of Electrical and Electronics Engineers (IEEE) 1394 bus, or a PCI Express (Ex) bus.

The image bus 110 connects an image processing unit 111 to the scanner unit 112 serving as an image input device and to a printer unit 113 serving as an image output device to perform conversion of image data between a synchronous system and an asynchronous system. The image processing unit 111 includes a plurality of application specific integrated circuits (ASICs) that performs image processing, such as resolution conversion, compression/decompression, and binary-to-multivalued conversion, on input image data and output image data.

An operation unit control unit B 108 for image data is an IF unit for an operation unit 114 (a user interface (UI)) and outputs, to the operation unit 114, image data to be displayed on the operation unit 114. The operation unit control unit B 108 also transmits, to the CPU 103, information input by the system user via the operation unit 114. The operation unit control unit B 108 is an I/F unit for the software to control the operation unit 114 including a display device, a keypad device, and a card reader device. In the present exemplary embodiment, the operation unit 114 includes a liquid crystal display (LCD) touch panel and the like, and interprets and displays a Video Graphics Array (VGA) signal output from the operation unit control unit B 108.

The scanner unit 112 includes an automatic document feeder (ADF) scanner and a flatbed (FB) scanner. The ADF scanner feeds a document placed on a document tray (not illustrated) included in the image processing apparatus 100. More specifically, the ADF scanner can continuously feed one sheet or a plurality of sheets of the document placed on the document tray serving as a document placement unit, read the image(s) of the fed document, and then generate image data.

The FB scanner can read the image of a document placed on a platen (not illustrated) included in the image processing apparatus 100 and generate image data. The FB scanner can read the image of the document fixedly placed on the glass of the platen by moving a reading sensor without feeding the document. In a case where the ADF scanner may not be able to feed a document due to the size or type (material or grammage) of the document. In such a case, the document is read by the FB scanner.

Figure 2:
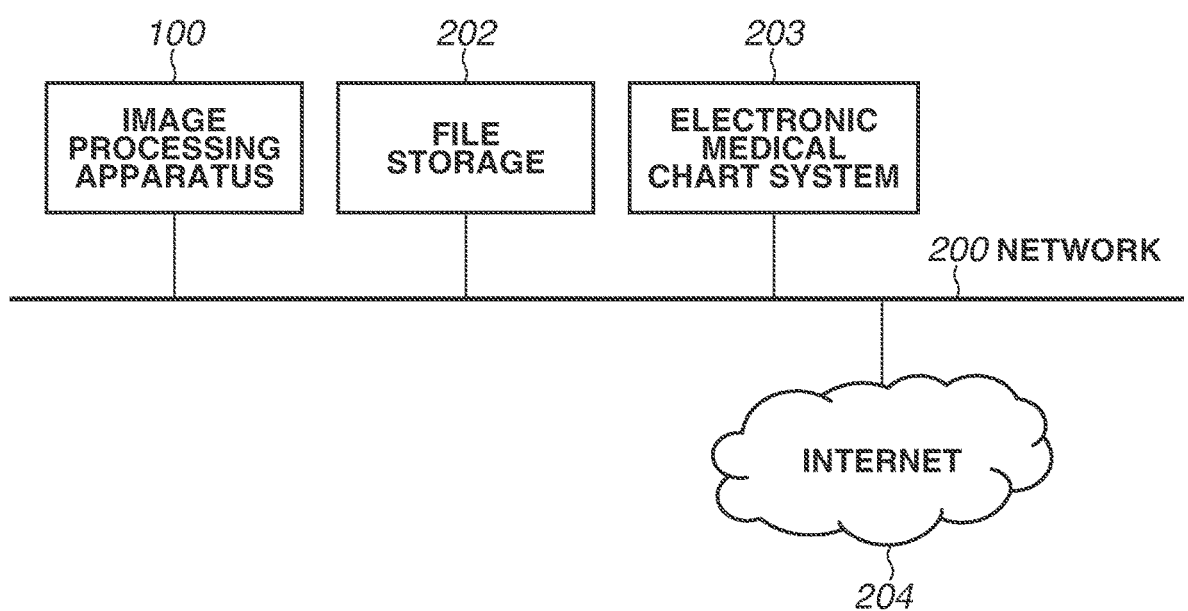
FIG. 2 is a block diagram illustrating an example of a network configuration including the image processing apparatus and an electronic medical chart system.

FIG. 2 illustrates an example of a network configuration including the image processing apparatus 100 and the electronic medical chart system 203. In the present exemplary embodiment, the image processing apparatus 100, a file storage 202, and the electronic medical chart system 203 are connected to a network 200. The network 200 is also connected to the Internet 204. The image processing apparatus 100 transmits, the image data generated by reading a document to the file storage 202 where the image data is stored. The electronic medical chart system 203 communicates with the first storage 202 to obtain the image data in the file storage 202 and registers the image data to the electronic medical chart system 203. The file storage 202 and the electronic medical chart system 203 can be included in the same apparatus. In another exemplary embodiment, the file storage 202 and the electronic medical chart system 203 can communicate with the image processing apparatus 100 via the Internet 204 instead of via the network 200. The image data in the present exemplary embodiment is document data in Portable Document Format (PDF) format, or image data in Tag Image File Format (TIFF) or Joint Photographic Experts Group (JPEG) format.

Figure 9:
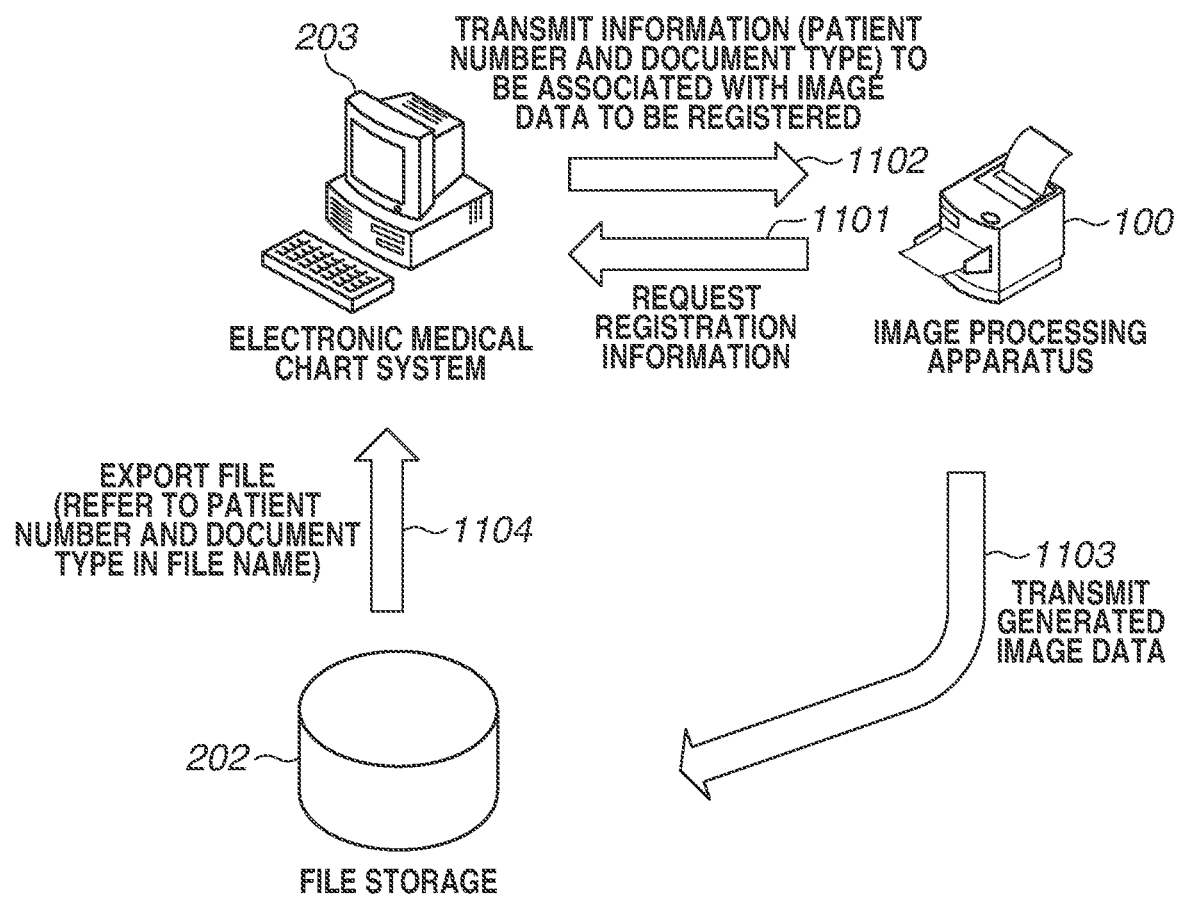
FIG. 9 is a diagram illustrating an example of communications between the image processing apparatus and the electronic medical chart system.

FIG. 9 illustrates an example of communications between the image processing apparatus 100 and the electronic medical chart system 203. More specifically, FIG. 9 illustrates communications performed between the image processing apparatus 100, the file storage 202, and the electronic medical chart system 203. When the image processing apparatus 100 is instructed to perform an electronic medical chart linkage function, the image processing apparatus 100 requests, as indicated by a communication 1101, the electronic medical chart system 203 to transmit candidate information to be associated with the image data to be registered in the electronic medical chart system 203. The electronic medical chart system 203 transmits, as indicated by a communication 1102, patient information such as a patient number and document type information, which are to be used for registration, to the image processing apparatus 100. The image processing apparatus 100 receives the patient information and the document type information via the communication 1102, and stores the received information in the storage memory 105. The image processing apparatus 100 transmits, as indicated by a communication 1103, the image data generated by reading a document to the file storage 202.

The electronic medical chart system 203 performs import processing for importing the image data stored in the file storage 202, as indicated by a communication 1104. The electronic medical chart system 203 can communicate with the file storage 202 at a predetermined time interval to check whether any image data is added to the file storage 202 and perform the import processing if any image data is added. In another exemplary embodiment, the electronic medical chart system 203 can perform the import processing in response to a user's operation. When the image data is to be imported, the electronic medical chart system 203 can copy the image data in the file storage 202 to a storage device in the electronic medical chart system 203, or can add a file path in the file storage 202 to a database in the electronic medical chart system 203.

Figure 10:
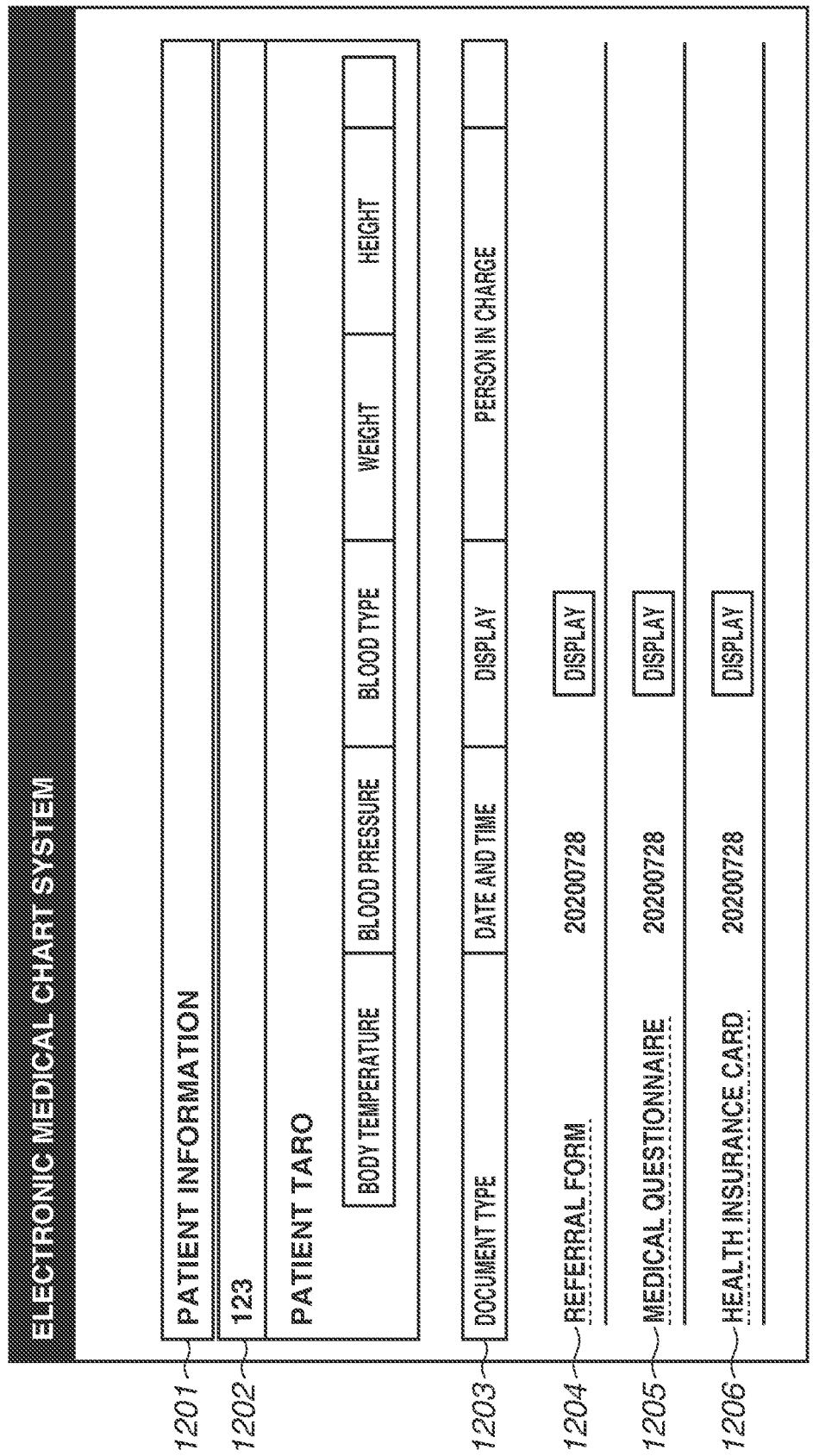
FIG. 10 is a diagram illustrating an example of a patient information screen of the electronic medical chart system.

FIG. 10 illustrates an example of a patient information screen of the electronic medical chart system 203. The patient information screen illustrated in FIG. 10 displays a list of image data registered in the electronic medical chart system 203 in association with a patient. The patient information screen is displayed on a display device of the electronic medical chart system 203 or a display device connected to the electronic medical chart system 203.

Patient information 1201 indicates information regarding the patient associated with the image data list being displayed. A patient identification (ID) 1202 is a patient ID of the patient associated with the image data list being displayed.

An image list 1203 indicates the image data list associated with the patient, and lists and displays the image data of which the file name has the same patient ID as that of the patient when the image data is imported. File types 1204 to 1206 indicate document type information about each image data, and each display the document type included in the file name when the image data is imported. The image of the imported image data is displayed when each file is selected. More specifically, in a case where the file name of the image data stored in the file storage 202 includes a character string "referral form", the document type is "referral form". Thus, selecting the "referral form" as the document type is equivalent to setting the file name.

Figure 3B:
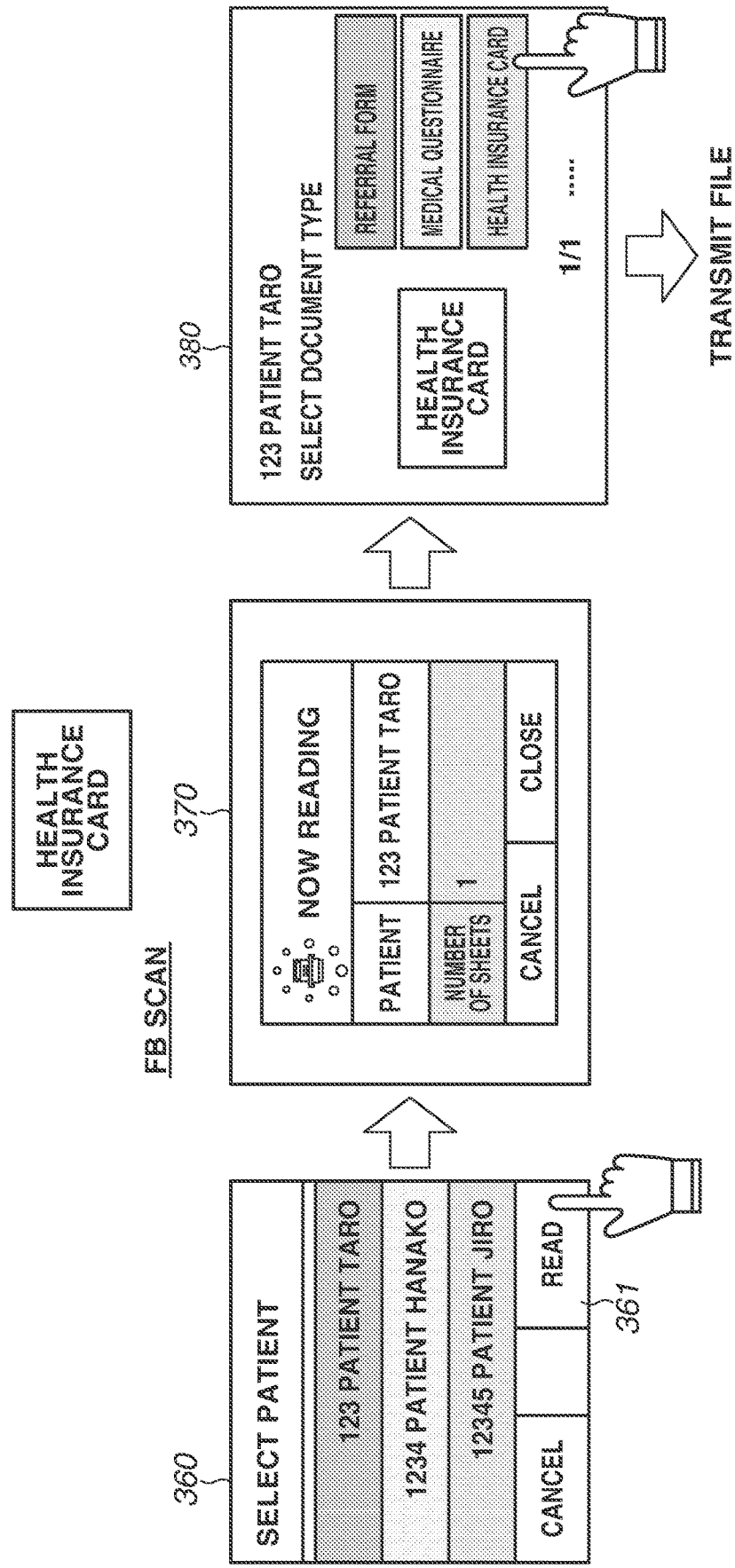

FIGS. 3A and 3B illustrate an example of a screen flow for registering the image data to the electronic medical chart system 203.

The operation unit 114 of the image processing apparatus 100 displays a home screen 310 where icons for performing various functions are displayed. An icon 311 is an icon for an electronic medical chart linkage function associated with importing a scanned document. When the user selects the icon 311, a patient selection screen 320 is displayed. Patient information (patient IDs and patient names) is listed and displayed on the patient selection screen 320. The user then places documents (a referral form and a medical questionnaire) on the document tray to scan the documents using the ADF, selects desired patient information, and selects a reading start button 321. In response to selection of the reading start button 321, the ADF starts reading the images of the documents, and a reading in progress screen 330 is displayed. Document type selection screens 340 and 350 are displayed when the reading is completed that enable the user to select a desired document type ("referral form" or "medical questionnaire"). When the document type is selected, the CPU 103 controls the image processing unit 111 to generate files (image data), and the generated files are transmitted to the file storage 202 via the LAN I/F unit 106 or the line I/F unit 107. The image data transmitted to the file storage 202 is stored in the database in the electronic medical chart system 203 by the import processing of the electronic medical chart system 203.

Next, the user places a document (a health insurance card) on the platen in order to perform a FB scan. The user then selects a desired patient on a patient selection screen 360 and selects a reading start button 361 by performing a similar operation to that described above. In response to selection of the reading start button 361, reading of the image of the document using the FB scan begins, and a reading in progress screen 370 is displayed. A document type selection screen 380 is displayed when the reading is completed that enables the user to select a desired document type ("health insurance card"). When the document type is selected, a file to be transmitted is generated and transmitted to the file storage 202 in a similar manner as described above. The image data transmitted to the file storage 202 is also similarly stored in the database in the electronic medical chart system 203 by the import processing of the electronic medical chart system 203.

In a case where the above-described system is provided, a user repeats the operation, such as placing a document and issuing a reading execution instruction, for each of the ADF scan and the FB scan. More specifically, a user inputs an execution instruction for scanning a plurality of documents using the ADF method and an execution instruction for scanning a document such as a health insurance card using the FB method.

To execute an operation using the above-described system, a user typically arranges a document to be scanned using the ADF method or the FB method, waits for completion of the document scan, and then sets another document to be scanned using the other method and inputs an execution instruction. The processing to be discussed below provides an enhancement to the execution operation.

FIG. 4 illustrates an example of a screen flow for performing processing for registering document set information. To read the first visit set (the referral form, the medical questionnaire, and the health insurance card), the image processing apparatus 100 is configured to register the document contents of the first visit set and the reading settings for the first visit set as the document set information. The documents to be submitted to a medical institution when a patient has a medical examination at the medical institution for the first time are set as the first visit set. A user can select which document to set on a screen 420.

A screen 410 is displayed when the user selects a button (not illustrated) for registering the document set information from a setting menu of the image processing apparatus 100 on the operation unit 114. A list of document set types are listed on the screen 410, and the screen 420 is displayed when one of the document set types is selected (in the present example, the first visit set is selected). The document types and the reading order are displayed on the screen 420 as the document contents of the first visit set. The screen 420 indicates that the referral form is to be read first, the medical questionnaire is to be read second, and the health insurance card is to be read third. The document types set on the screen 420 are the document type information received from the electronic medical chart system 203 in advance via the communication 1102. For example, in a case where the image processing apparatus 100 has received and stored the document type information, such as the "referral form", the "medical questionnaire", the "health insurance card", from the electronic medical chart system 203, the information appears when the user selects an "add" button on the screen 420. The user can then select a desired document type from among the document types.

When the user selects a document type on the screen 420, a screen 430 is displayed. The user can set reading settings for the selected document via the screen 430. More specifically, the user can set a reading method (the ADF scan or the FB scan) and the number of document sheets, in addition to setting items (double-sided setting, color mode, resolution, and file format). As illustrated in FIG. 4, in the present example, the number of sheets of the medical questionnaire is set to one on the screen 430. The number of sheets of the medical questionnaire is then changed to two as illustrated on a screen 440.

While not illustrated in FIG. 4, the user can set the transmission destination of the image data generated by the scan associated with the document set information (e.g., the first visit set). For example, a specific folder in the file storage 202 is set as the transmission destination of the image data generated by selecting and scanning the first visit set. More specifically, an Internet Protocol (IP) address or a host name of the file storage 202, or a path to the folder in which the image data is to be stored is set as the transmission destination in association with the document set information.

The setting screens illustrated in FIG. 4 enable a user to associate the document type (the file name), the reading method (the ADF scan or the FB scan), and the reading settings (the double-sided setting, the color mode setting, the resolution setting, and the file format setting) with each other.

As described above, elements of document set information suitable for basic routine tasks are registered in advance and the user can simply use the registered information. In another exemplary embodiment, the settings can be changed depending on, for example, a business form of each medical facility implementing the electronic medical chart system.

Figure 5:
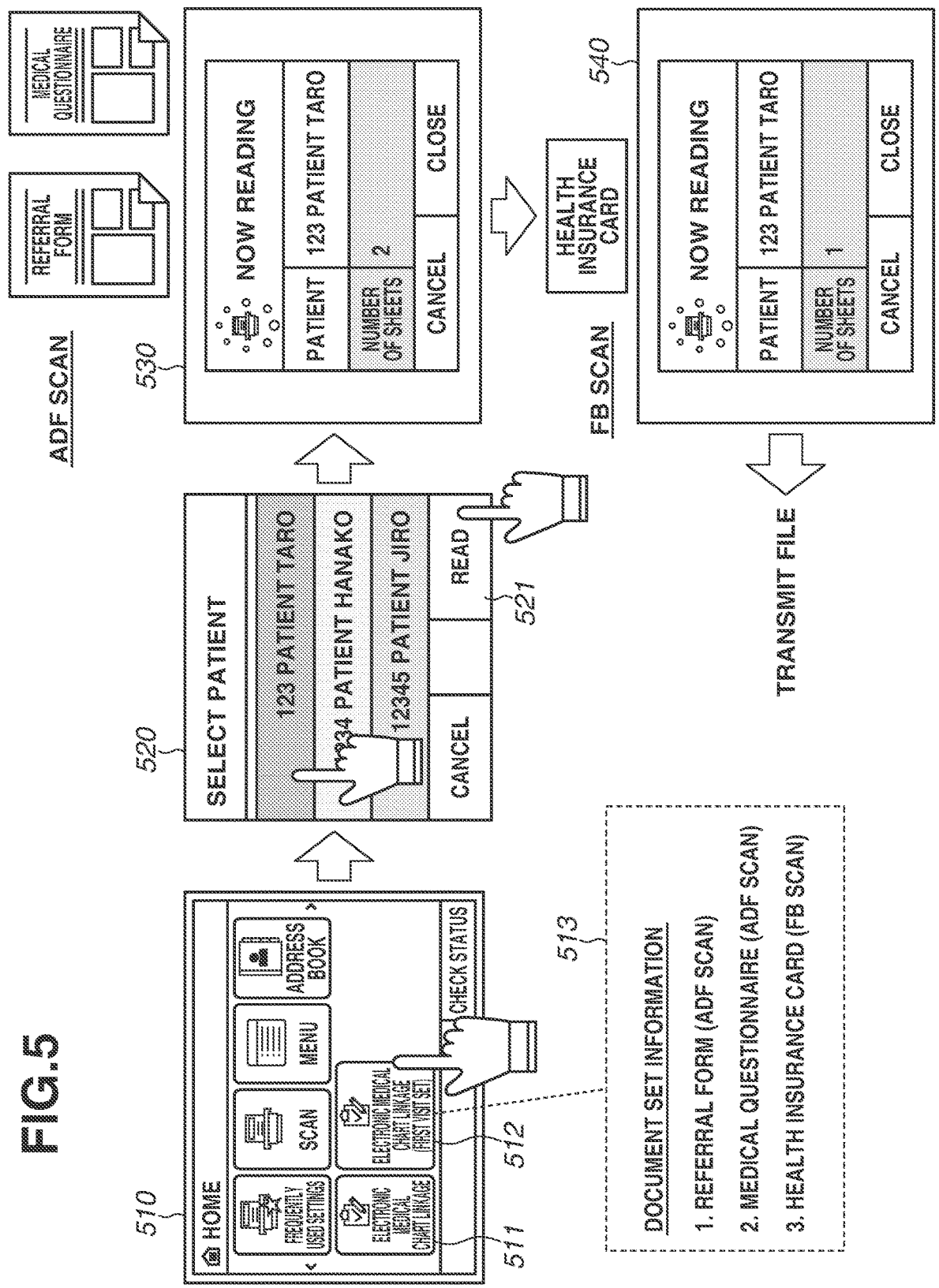
FIG. 5 is a diagram illustrating an example of a screen flow for reading images of documents and transmitting resultant image data by using an electronic medical chart linkage function.

FIG. 5 illustrates an example of a screen flow for reading the images of the documents and transmitting the resultant image data by using the electronic medical chart linkage function.

A home screen 510 and an icon 511 displayed on the operation unit 114 are similar to the home screen 310 and the icon 311 in FIG. 3A, respectively. An icon 512 corresponding to the electronic medical chart linkage function for the first visit set is also displayed. The icon 512 is a button displayed when information about the first visit set is set on the setting screens in FIG. 4. The icon 512 is associated with document set information 513 about the first visit set described with reference to FIG. 4.

When the user selects the icon 512, a patient selection screen 520 is displayed. Using the patient selection screen 520, the user selects the patient information to be associated with image data. The user places the documents (the referral form and the medical questionnaire) on the document tray for the ADF scan and the document (the health insurance card) on the platen for the FB scan, selects a desired patient, and then selects a reading start button 521. Since the health insurance card that cannot be scanned by the ADF is included in the first visit set, the health insurance card is set to be read using the FB scan. Since the referral form and the medical questionnaire can be read by the ADF, the referral form and the medical questionnaire are set to be read using the ADF scan.

When the user selects a desired patient number and selects the reading start button 521, i.e., the user inputs an execution instruction, reading of the documents by the ADF is started and a reading in progress screen 530 is displayed. When the reading of the documents by the ADF is completed, reading of the document using the FB method is automatically started and a reading in progress screen 540 is displayed. When the reading of the document using the FB method is completed, the CPU 103 controls the image processing unit 111 to generate image data, and the generated image data is transmitted to the file storage 202 via the LAN I/F unit 106 or the line I/F unit 107.

In the example of FIG. 5, the user places the referral form and the medical questionnaire on the document tray to perform the ADF scan. More specifically, since the referral form is set to be read first and the medical questionnaire is set to be read second, the referral form and the medical questionnaire are placed on the document tray in a state where the referral form is placed on the medical questionnaire. In this way, the referral form placed on the top is fed first by the ADF and the document image thereof is read. After the referral form is fed, the medical questionnaire is automatically fed and the document image thereof is read. Since the health insurance card is set to be read third, the health insurance card placed on the platen is read using the FB scan upon completion of the reading of the medical questionnaire. In this way, the image processing apparatus 100 can read the documents using both the ADF method and the FB method by receiving a single execution instruction from the user in a state where the user places the documents to be read using the ADF method on the document tray and places the document to be read using the FB method on the platen.

Figure 6A:
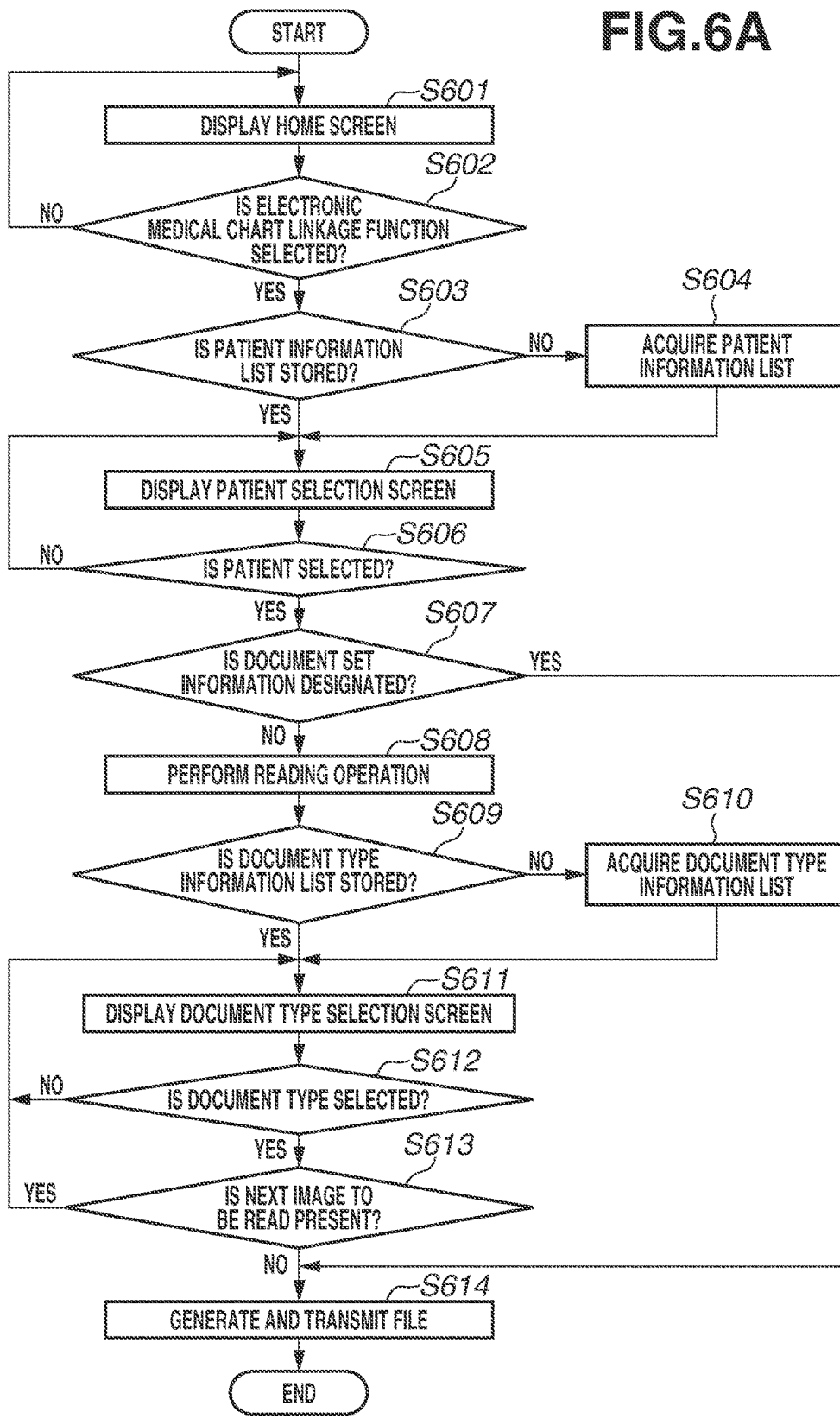
FIGS. 6A and 6B are a flowchart illustrating an example of processing performed when the images of the documents are read and the resultant image data is transmitted by using the electronic medical chart linkage function.
Figure 6B:
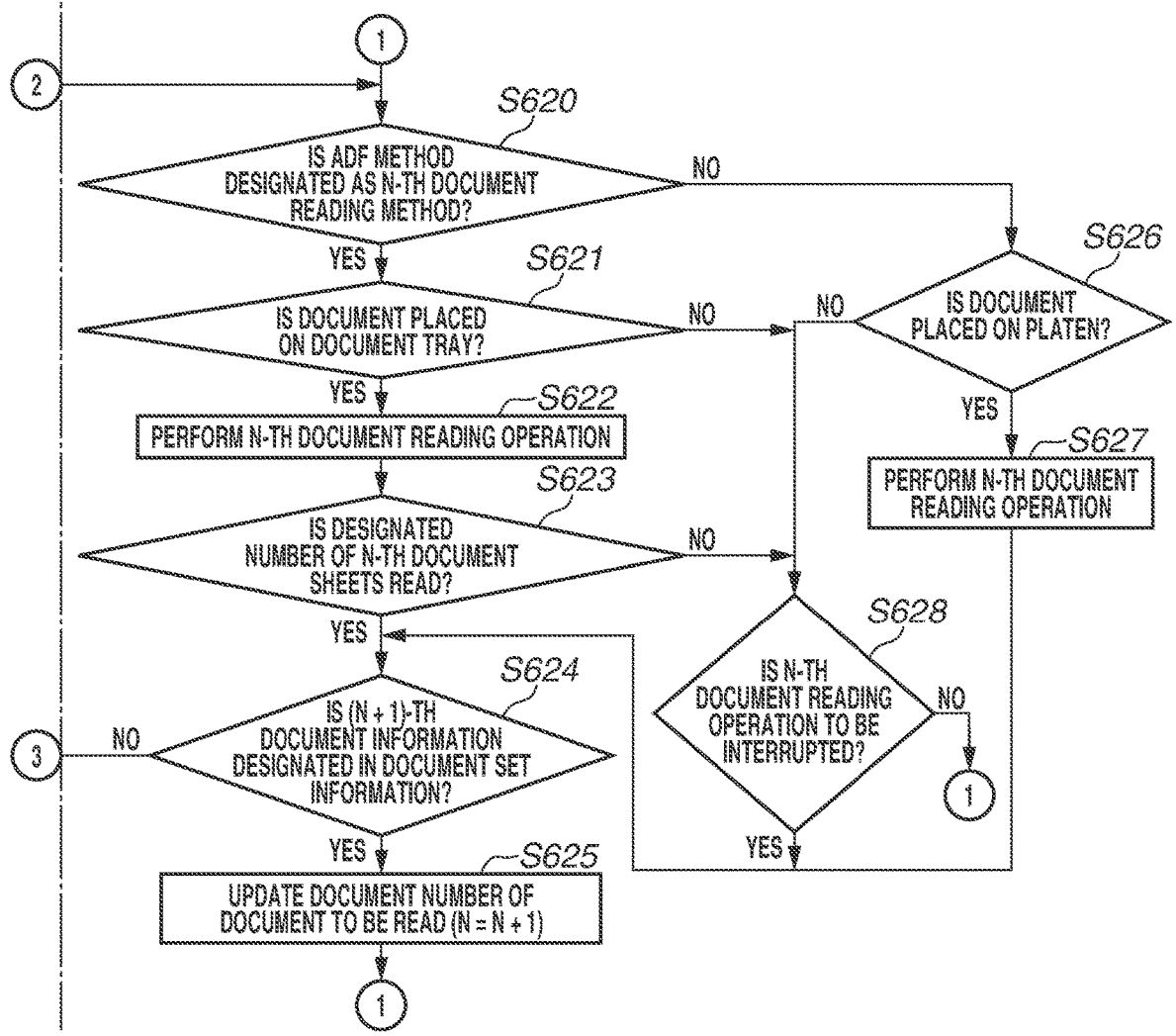

FIGS. 6A and 6B are a flowchart illustrating an example of processing performed when the electronic medical chart linkage function is used to read the images of the documents and transmit the resulting image data. The flowchart in FIGS. 6A and 6B is started when the image processing apparatus 100 is powered on.

In step S601, the CPU 103 displays the home screen 510 on the operation unit 114. At this time, the icons 511 and 512 described with reference FIG. 5 are displayed on the home screen 510.

In step S602, the CPU 103 determines whether the icon 511 or the icon 512 is selected (i.e., whether the electronic medical chart linkage function is selected). In a case where the CPU 103 determines that the icon 511 or the icon 512 is selected (YES in step S602), the processing proceeds to step S603. Otherwise (NO in step S602), the processing returns to step S601.

In step S603, the CPU 103 checks whether a latest patient information list of the linking electronic medical chart system 203 is stored in the RAM 104 or the storage memory 105. If the latest patient information list is not stored (NO in step S603), the processing proceeds to step S604. In step S604, the CPU 103 acquires the latest patient information list from the electronic medical chart system 203. In the present exemplary embodiment, the latest patient information list is a patient information list acquired within a predetermined time period.

In step S605, the CPU 103 displays the contents of the patient information list on the patient selection screen 520. In step S606, the CPU 103 determines whether a patient is selected. If a patient is selected (YES in step S606), the processing proceeds to step S607. If a patient is not selected (NO in step S606), the processing returns to step S605. In step S607, the CPU 103 determines whether the document set information is designated.

More specifically, in a case where the icon 512 is selected in step S602, the CPU 103 determines that the first visit set is designated, and in a case where the icon 511 is selected in step S602, the CPU 103 determines that no document set information is designated.

In step S607, in a case where the CPU 103 determines that the document set information is designated (YES in step S607), the CPU 103, based on the document set information stored in the RAM 104 or the storage memory 105, reads the documents in order from the first document (N=1) based on the contents of the document set information. The processing then proceeds to step S620.

In step S620, the CPU 103 determines whether the ADF method is designated as an N-th document reading method in the document set information. In a case where the CPU 103 determines that the ADF method is designated as the N-th document reading method (YES in step S620), the processing proceeds to step S621. If it is determined that the ADF method is not designated as the N-th document reading method (NO in step S620), i.e., in a case where the CPU 103 determines that the FB method is designated as the N-th document reading method, the processing proceeds to step S626.

In step S621, the CPU 103 determines whether the document to be fed by the ADF is placed on the document tray. The determination is made based on a detection result by a document detection sensor provided on the document tray. In a case where the CPU 103 determines that the document is placed on the document tray (YES in step S621), the processing proceeds to step S622. If the document is not determined to be placed on the document try (NO in step S621), the processing proceeds to step S628.

In step S622, the CPU 103 causes the ADF to feed the document placed on the document tray to read the image of the fed document.

In step S623, the CPU 103 determines whether the image(s) of the sheet(s) corresponding to the number of sheets designated in the document set information has been read using the ADF. In a case where the CPU 103 determines that the image(s) of the sheet(s) corresponding to the number of sheets designated in the document set information is read (YES in step S623), the processing proceeds to step S624. If the image(s) of the sheet(s) corresponding to the number of sheets designated in the document set information is not read (NO in step S623), the processing proceeds to step S628. For example, in a case where the number of sheets of the N-th document is set to two in the document set information, but the user placed one sheet on the document tray, the determination result in step S623 is NO In step S624, the CPU 103 determines whether (N+1)-th document information is designated in the selected document set information. In a case where the CPU 103 determines that (N+1)-th document information is designated (YES in step S624), the processing proceeds to step S625. If the (N+1)-th document information is not designated (NO in step S624), the processing proceeds to step S614. In step S614, the CPU 103 controls the image processing unit 111 to generate image data (files). At this time, the image data (the files) is generated in such a manner that a different file is generated for each document type.

For example, in the case of the first visit set in FIG. 5, the image data generated by reading the image(s) of the sheet(s) corresponding to the number of sheets set associated with each of the document types. In other words, the CPU 103 generates a referral form file, a medical questionnaire file, and a health insurance card file. The CPU 103 also sets file names for each of these files.

Figure 8:
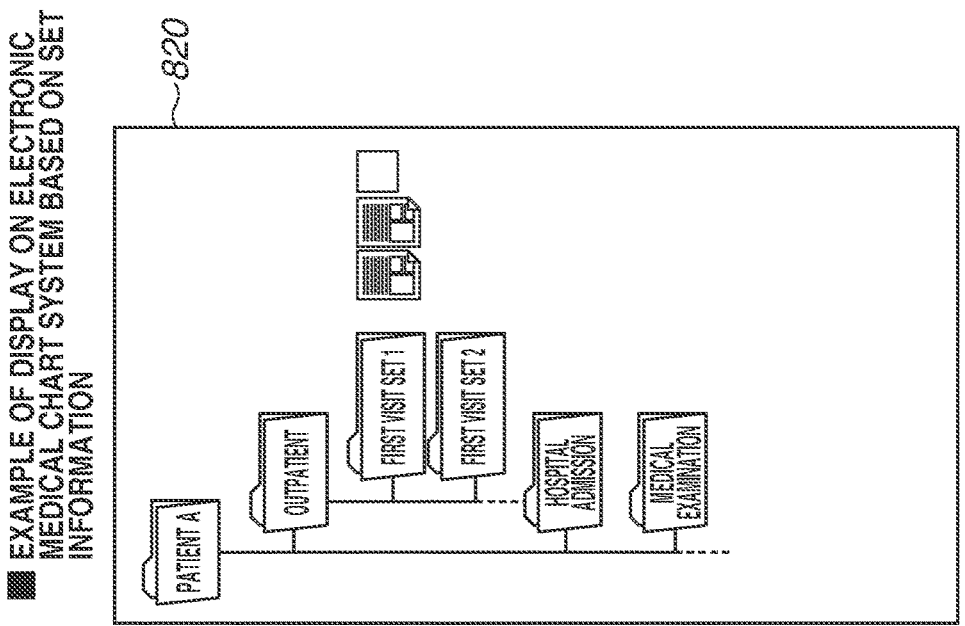
FIG. 8 is a diagram illustrating document set information addition processing according to an exemplary embodiment.

The file names of the files generated at this time are set as illustrated in FIG. 8. More specifically, each of the file names includes information about a patient ID, a document type, a date and time, and a set number. Referring to the example of FIG. 5, each of the file names includes the patient ID "12345" corresponding to the "Patient Jiro" selected through the patient selection screen 520. The file name of the file generated by reading the referral form includes the character string "referral form". Each of the file names also includes the date and time when the document is scanned. Each of the file names also includes the set number of the document set information set in advance. In the case of the first visit set, each of the file names includes the set number "1111". More specifically, in a case where the first visit set is selected, the patient "Patient Jiro" is selected, and the referral form is read "at 15:21:30 on July 28 in 2020", the following file name is assigned: "[12345]_[referral form]_[20200728152130]_[1111].pdf".
In this case, the character string "referral form" included in the file name as the document type may not be exactly the same character string as that set via the screen 420. For example, the character string can be "shokaijo" (a referral form in Japanese) as long as the character string is based on the set document type "referral form".

In step S614, the generated files are transmitted to the file storage 202 via the LAN I/F unit 106 or the line I/F unit 107. The processing then ends.

In step S625, the CPU 103 updates the document number from N to N+1 in order to read the document having the next document number. The processing then returns to step S620.

In step S626, the CPU 103 determines whether the document is placed on the platen in order to read the document using the FB method. The determination is made based on a detection result by a sensor of the platen. In a case where the CPU 103 determines that the document is placed on the platen (YES in step S626), the processing proceeds to step S627. If the document is not determined to be placed on the platen (NO in step S626), the processing proceeds to step S628.

In step S627, the CPU 103 causes the FB scanner to read the image of the document placed on the platen. Then, the processing proceeds to step S624.

In step S628, the CPU 103 determines whether to interrupt the N-th document reading operation. In a case where the N-th document reading operation is to be interrupted (YES in step S628), the processing proceeds to step S624. When the N-th document reading operation is not to be interrupted (NO in step S628), the processing returns to step S620. In step S626, the CPU 103 determines again whether a document is placed on the platen. At this time, the determination of whether to interrupt the N-th document reading operation can be made based on information set in advance, or can be based on a user instruction on a displayed user instruction screen.

For example, in a case where the document set information is the first visit set that is set via the screen 420, the processing in steps S621 to S627 is performed as follows. The ADF feeds and reads the first document (i.e., the referral form of one sheet) and then feeds and reads the second document (i.e., the medical questionnaire of one sheet). Thereafter, the third document (i.e., the health insurance card of one sheet) is read using the FB method. For example, in a case where the number of sheets of the referral form is set to two, a file is generated to include the data corresponding to the first and second sheets of the fed document, as a file of the referral form. More specifically, the PDF file "[12345]_[referral form]_[20200728152130]_[1111].pdf" includes the data corresponding to two pages.

In the screen 420 in FIG. 4, the referral form to be read by the ADF is set to be read first. In another exemplary embodiment, the health insurance card to be read using the FB method can be set to be read first. In other words, a document image can be read using each reading method based on the reading order set by the user.

In step S607, in a case where no document set information is designated (NO in step S607), the processing proceeds to step S608. In step S608, the CPU 103 performs a reading operation using the ADF method or the FB method. In step S609, the CPU 103 checks whether a latest document type information list of the linking electronic medical chart system 203 is stored in the RAM 104 or the storage memory 105. If the latest document type information list is not stored (NO in step S609), the processing proceeds to step S610. In step S610, the CPU 103 acquires the document type information list from the electronic medical chart system 203, and the processing then proceeds to step S611. If the latest document type information list is stored (YES in step S609), the processing proceeds to step S611.

In step S611, the CPU 103 displays the contents of the document type information list for each read image. In step S612, the CPU 103 determines whether a document type is selected. If a document type is selected (YES in step S612), the processing proceeds to step S613. If a document type is not selected (NO in step S612), the processing returns to step S611. In step S613, the CPU 103 determines whether a next image to be read is present. If the next image to be read is present (YES in step S613), the processing returns to step S611 to display the contents of the document type information list again. If the next image to be read is not present (NO in step S613), the processing proceeds to step S614. In step S614, the CPU 103 generates and transmits the file(s). The processing then ends.

FIG. 8 illustrates an example of a file name setting method. To automatically register a scanned document file to the electronic medical chart system 203, identification information associated with the patient and the document type are to be added to the file. The identification information and the document type can be added to the file as a file name. In this case, the image processing apparatus 100 according to the present exemplary embodiment adds information, such as the patient ID, the document type, and the reading date and time, to the file name based on the contents designated at the time of reading or the contents of the document set information, and transmits the file to the file storage 202. The electronic medical chart system 203 uses the file name to identify the patient ID and the document type, so that the files can be classified according to patient ID or document type, and registered and stored in the file system in the electronic medical chart system 203.

At this time, the image processing apparatus 100 can also add an identifier (e.g., a set number) of the document set information to the file name of the file that is to be transmitted to the file storage 202. This enables the electronic medical chart system 203 to determine that the document files are generated in the same routine task, and to store the document files collectively in the same folder in the file system in the electronic medical chart system 203. This makes the document management easier.

A file name format 810 indicates a format including the identifier of the document set information, and includes the patient ID, the document type, the date and time, and the set number. For example, the file names of the referral form, the medical questionnaire, and the health insurance card are a file name 811, a file name 812, and a file name 813, respectively. A display example 820 illustrates a folder configuration in a case where the electronic medical chart system 203 identifies the set number to collectively store the corresponding files in the same folder. For example, the files with the file names 811 to 813 are stored in a folder with a name of "first visit set 1".

FIG. 11 illustrates an example of a patient information screen of the electronic medical chart system 203 that is displayed in a case where the document set information is added. The patient information screen in FIG. 11 is a registration screen displayed in a case where the set numbers are identified as in the display example 820 in FIG. 8 and the related files are collected in the same folder on the registration screen illustrated in FIG. 10. Items 1301 and 1303 are similar to the items 1201 and 1203 in FIG. 10.

File types 1304 to 1306 corresponding to the documents of the first visit set (the referral form, the medical questionnaire, and the health insurance card) are collectively stored in the same folder named "first visit reception".

The above-described processing enhances a user's experience in a case where a document is scanned using the ADF method and another document is scanned using the FB method.

In the first exemplary embodiment, the execution instruction for reading a document can be input even in a state where no document is placed on the document tray or the platen. In a second exemplary embodiment, an example of prohibiting the input of the execution instruction if no document is placed on the document tray or the platen corresponding to the designated reading method will be discussed.

FIGS. 7A and 7B illustrate an example of a screen flow for reading the images of the documents and transmitting the resultant image data by using the electronic medical chart linkage function according to the second exemplary embodiment.

In the present exemplary embodiment, before reading of the images begins, the user places the documents on both the document tray for the reading using the ADF method and the platen for the reading using the FB method. This processing is intended to prevent the occurrence of a shortage of documents to be read if the reading of the documents is started in a state where the documents are not placed on both the document tray and the platen. If a shortage of documents to be read occurs, for example, there is a possibility that a white image can be read because no document is placed on the platen and a white board is read. To prevent the document placement error, in the present exemplary embodiment, the CPU 103 performs control to display a document placement status on a screen for inputting a reading execution instruction, and to enable a reading start button after the document placement status has become the document placement status corresponding to the designated document set information.

Items 710 to 713 in FIG. 7A are the same as the items 510 to 513 in FIG. 5. When the user selects an icon 712, a patient selection screen 720 is displayed. At the top of the patient selection screen 720, a document placement status 722 is displayed. The document set information designated at this time is the first visit set as in FIG. 5. The patient selection screen 720 is displayed when no documents are placed on either the document tray or the platen. For the first visit set, scanning is to be performed using both the ADF method and the FB method. Thus, a reading start button 721 is disabled and the user cannot input an execution instruction.

When a document is placed on the document tray, a document placement status 732 appears as "ADF: PLACED, FB: NOT PLACED" as displayed on a screen 730 as illustrated in FIG. 7B. For the first visit set, since scanning is to be performed using both the ADF method and the FB method, a reading start button 731 is disabled and the user cannot input an execution instruction.

When a document is also placed on the platen, a document placement status 742 changes to "ADF: PLACED, FB: PLACED" as displayed on a screen 740, a reading start button 741 is enabled, and the user can input an execution instruction.

In the above-described example, the reading start button is grayed out to prohibit the user from inputting an execution instruction. However, the present exemplary embodiment is not limited thereto. For example, the image processing apparatus 100 can be configured such that the user can input an execution instruction (i.e., the user can select the reading start button 741), but the image processing apparatus 100 ignores the instruction and does not perform the reading processing. At this time, the operation unit 114 can display a message to prompt the user to place a document.

The above-described exemplary embodiments enable users to save time and effort when a document is scanned using the ADF method and another document is scanned using the FB method.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, these embodiments are not seen to be limiting. The scope of the following claims is to be accorded the broadest interpretation so as to encompass all such modifications and equivalent structures and functions.

This application claims the benefit of Japanese Patent Application No. 2021-102402, filed Jun. 21, 2021, which is hereby incorporated by reference herein in its entirety.

What is claimed is:

1. An information processing apparatus comprising:
a feeding unit configured to feed a document placed on a document placement unit;
a reception unit configured to receive an execution instruction;
a first reading unit configured to read an image of the document fed from the document placement unit by the feeding unit to generate first image data;
a second reading unit configured to read an image of a document placed on a platen to generate second image data;
a registration unit configured to register first character information in association with a reading method that uses the first reading unit and second character information in association with a reading method that uses the second reading unit;
an execution unit configured to, based on the reception unit receiving a single execution instruction, execute first processing in which the first reading unit reads the image of the document fed from the document placement unit to generate the first image data, and second processing in which the second reading unit reads the image of the document placed on the platen to generate the second image data;
a generating unit configured to generate, based on the first image data, a first file having a first file name including the registered first character information and generate, based on the second image data, a second file having a second file name including the registered second character information, the second file name being different from the first file name; and
a transmitting unit configured to transmit the generated first file and the generated second file to a server.

2. The information processing apparatus according to claim 1, further comprising:
a setting unit configured to set the registered first file name including the registered first character information as a file name of the first file and set the second file name including the registered second character information as a file name of the second file.

3. The information processing apparatus according to claim 1,
wherein the registration unit further registers a first reading setting in association with the reading method that uses the first reading unit and a second reading setting in association with the reading method that uses the second reading unit.

4. The information processing apparatus according to claim 3, wherein the first reading setting and the second reading setting are settings regarding a color mode.

5. The information processing apparatus according to claim 3, wherein the first reading setting and the second reading setting are settings regarding a double-sided print setting.

6. The information processing apparatus according to claim 1, further comprising:
a transmission destination setting unit configured to set a transmission destination,
wherein the transmitting unit transmits the first file and the second file to a specific transmission destination set by the transmission destination setting unit.

7. The information processing apparatus according to claim 1, further comprising an order setting unit configured to, before the reception unit receives the execution instruction, set whether the execution unit executes the second processing after executing the first processing or executes the first processing after executing the second processing,
wherein the execution unit executes the first processing and the second processing based on the reception unit receiving the single execution instruction from the user and based on the setting set by the order setting unit.

8. A method for controlling an information processing apparatus including a document placement unit and a platen, the method comprising:
receiving an execution instruction;
reading an image of a document fed from the document placement unit to generate first image data;
reading an image of a document placed on the platen to generate second image data;

registering first character information in association with a reading method for reading the image of the document fed from the document placement unit and second character information in association with a reading method for reading the image of the document placed on the platen;

executing, based on receiving a single execution instruction, first processing of reading the image of the document fed from the document placement unit to generate the first image data and second processing of reading the image of the document placed on the platen to generate the second image data;

generating, based on the first image data, a first file having a first file name including the registered first character information and generating, based on the second image data, a second file having a second file name including the registered second character information, the second file name being different from the first file name; and transmitting the generated first file and the generated second file to a server.

9. A non-transitory computer-readable storage medium storing a program that, when executed by a computer, causes the computer to perform a method for controlling an information processing apparatus including a document placement unit and a platen, the method comprising:

receiving an execution instruction;

reading an image of a document fed from the document placement unit to generate first image data;

reading an image of a document placed on the platen to generate second image data;

registering first character information in association with a reading method for reading the image of the document fed from the document placement unit and second character information in association with a reading method for reading the image of the document placed on the platen;

executing, based on receiving a single execution instruction, first processing of reading the image of the document fed from the document placement unit to generate the first image data, and second processing of reading the image of the document placed on the platen to generate the second image data;

generating, based on the first image data, a first file having a first file name including the registered first character information and generating, based on the second image data, a second file having a second file name including the registered second character information, the second file name being different from the first file name; and transmitting the generated first file and the generated second file to a server.

* * * * *